(12) United States Patent
Jang et al.

(10) Patent No.: US 6,718,090 B2
(45) Date of Patent: Apr. 6, 2004

(54) AUTOMATIC DEVICE FOR ASSEMBLING FIBER COLLIMATOR

(76) Inventors: Win-Yann Jang, No. 7, Alley 19, Lane 131, Anho Road, Taichung (TW); Hai-Haun Tsai, 14 F-1, No. 266, Wu Lin Road, HsinChu (TW); I-Han Wu, No. 8, Lane 164, Phone Huang Rd., TaiChung Hsien (TW)

(*) Notice: Subject to any disclaimer, the term of this patent is extended or adjusted under 35 U.S.C. 154(b) by 71 days.

(21) Appl. No.: 10/157,300

(22) Filed: May 28, 2002

(65) Prior Publication Data

US 2002/0181865 A1 Dec. 5, 2002

(30) Foreign Application Priority Data

May 29, 2001 (TW) ..................................... 90208776 U

(51) Int. Cl.$^7$ ................................................ G02B 6/32
(52) U.S. Cl. .............................. 385/34; 385/31; 385/52; 385/134
(58) Field of Search ............................... 385/31–34, 52, 385/93, 134, 139

(56) References Cited

U.S. PATENT DOCUMENTS

| | | | |
|---|---|---|---|
| 5,588,077 A | 12/1996 | Woodside | ..................... 385/26 |
| 5,904,413 A * | 5/1999 | Ruegenberg et al. | ...... 356/73.1 |
| 6,019,522 A | 2/2000 | Kim | ............................. 385/80 |
| 6,023,542 A | 2/2000 | Pan et al. | ...................... 385/24 |
| 6,148,126 A | 11/2000 | Zheng | ........................... 385/34 |
| 2003/0142908 A1 * | 7/2003 | Mao et al. | .................... 385/33 |
| 2003/0147595 A1 * | 8/2003 | Matmon et al. | ............. 385/52 |

* cited by examiner

*Primary Examiner*—Hemang Sanghavi
(74) *Attorney, Agent, or Firm*—Pro-Techtor International

(57) ABSTRACT

An automatic device for assembling a fiber collimator. The fiber collimator includes a transparent tubular holder, an optical fiber having a first end surface disposed at an end of the tubular holder, and a GRIN lens having a second end surface disposed at the other end of the tubular holder. The automatic device includes an image pick-up device, a processor, a first driving table for rotating and moving the optical fiber, and a second driving table for rotating and moving the GRIN lens. The image pick-up device films the first and second end surfaces, and outputs image data corresponding to the first and second end surfaces. The processor receives and processes the image data to control the first and second driving table to rotate so that the first and second end surfaces are parallel to each other, and control the first and second driving table to move so that a distance between the first and second end surfaces is equal to a predetermined value.

7 Claims, 7 Drawing Sheets

AUTOMATIC DEVICE FOR ASSEMBLING FIBER COLLIMATOR

BACKGROUND OF THE INVENTION

1. Field of the Invention

The present invention relates in general to an automatic device for assembling fiber collimators.

2. Description of the Related Art

In a fiber-optic link, an optical fiber is connected to another optical fiber via fusion splice or via a connector plus an adapter. However, an optical fiber has a limitation of a numerical aperture so that a laser beam diverges at an angle when propagating from the optical fiber. To prevent the laser beam from diverging, a fiber collimator, a very important element in communication, has been invented.

A typical fiber collimator includes a pigtail, a GRIN (GRaded INdex) lens and a tubular holder. U.S. Pat. No. 6,019,522 discloses the structure of a fiber collimator and the epoxy used therein. U.S. Pat. No. 6,023,542 discloses a fiber collimator including a GRIN lens, and a fiberoptic coupler including the fiber collimator. U.S. Pat. No. 6,148,126 discloses a dual-fiber optical collimator and a method of assembling the collimator. U.S. Pat. No. 5,588,077 discloses a rotary joint including a fiber collimator. However, no prior art is related to an automatic device for assembling fiber collimators.

Energy loss is an important parameter for a fiber collimator. Generally, energy loss arises from misalignment of the ferrule with the GRIN lens and also arises from the parts themselves of the fiber collimator. The energy loss arising from the parts of the fiber collimator is unavoidable. To improve energy loss, therefore, manufacturers focus on the misalignment of the ferrule with the GRIN lens.

SUMMARY OF THE INVENTION

An object of the present invention is to provide an automatic device for assembling fiber collimators to promote the efficiency of manufacture and yield.

In the present invention, the fiber collimator includes a "transparent" tubular holder, an optical fiber having a first end surface disposed at an end of the tubular holder, and a GRIN lens having a second end surface disposed at the other end of the tubular holder. The automatic device includes an image pick-up device, a processor, a first driving table for rotating and moving the optical fiber, and a second driving table for rotating and moving the GRIN lens. The image pick-up device films the first and second end surfaces, and outputs image data corresponding to the first and second end surfaces. The processor receives and processes the image data to control the first and second driving table to rotate so that the first and second end surfaces are parallel to each other, and control the first and second driving table to move so that a distance between the first and second end surfaces is equal to a predetermined value.

By the automatic device for assembling fiber collimators, the efficiency of manufacture and the yield are greatly improved.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
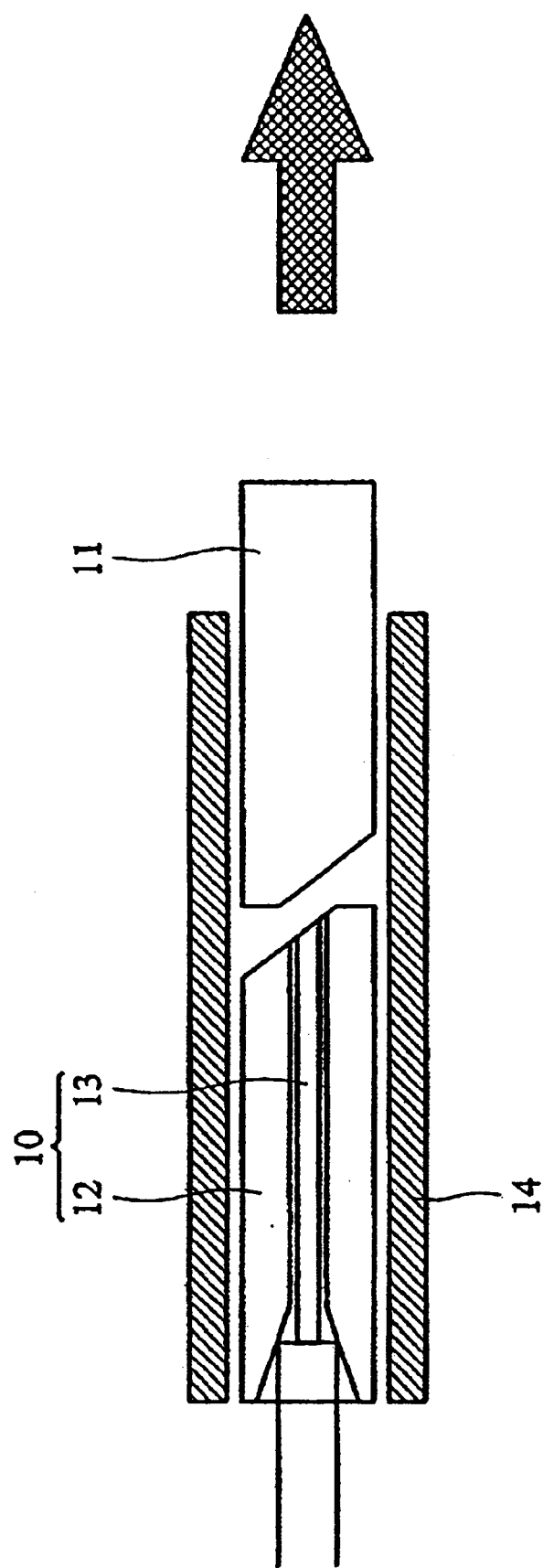
FIG. 1 depicts a typical fiber collimator.

Referring to FIG. 1, a pigtail 10 includes an optical fiber 13 and a ferrule 12. A GRIN (GRaded INdex) lens 11 is disposed at one end of a tubular holder 14, while a pigtail 10 is disposed at the other end. The emitted laser light is collimated only when the end surface of the pigtail 10 is parallel to that of the GRIN lens 11. Furthermore, the distance between the ferrule 12 and the GRIN lens 11 determines a position outside the GRIN lens 11 where the energy loss of the laser light is minimum.

Figure 2:
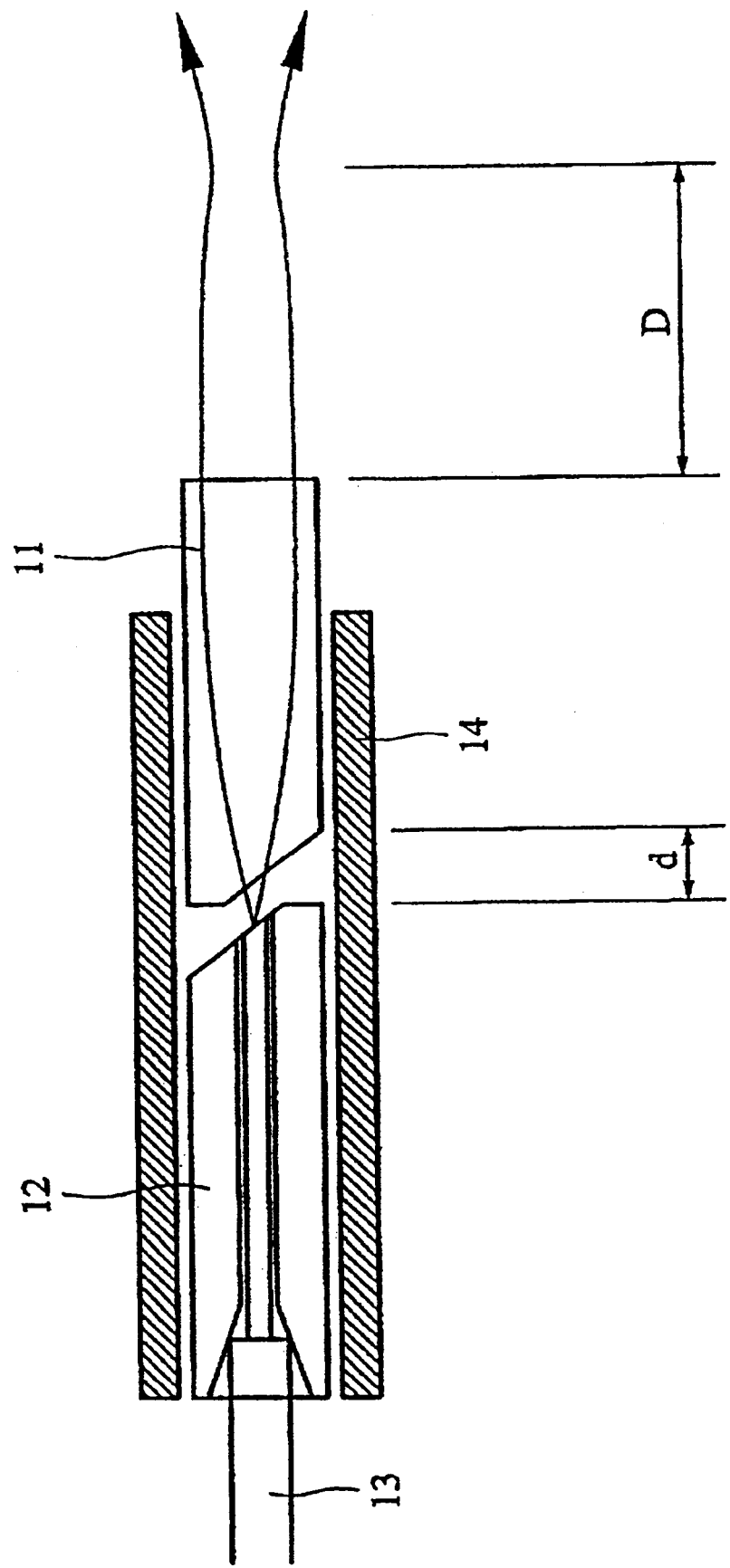
FIG. 2 is used for introducing a working distance of a single fiber collimator.
Figure 3:
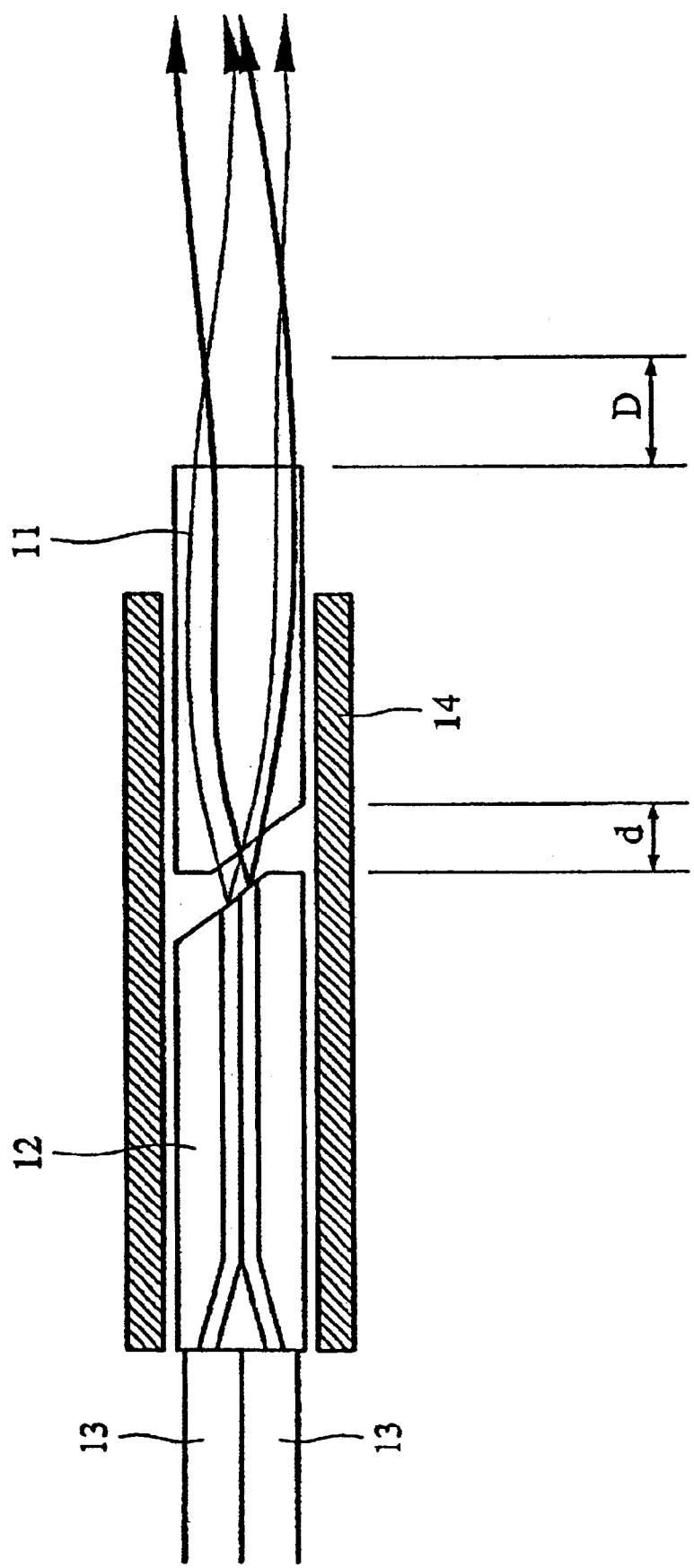
FIG. 3 is used for introducing a working distance of a dual fiber collimator.
Figure 4:
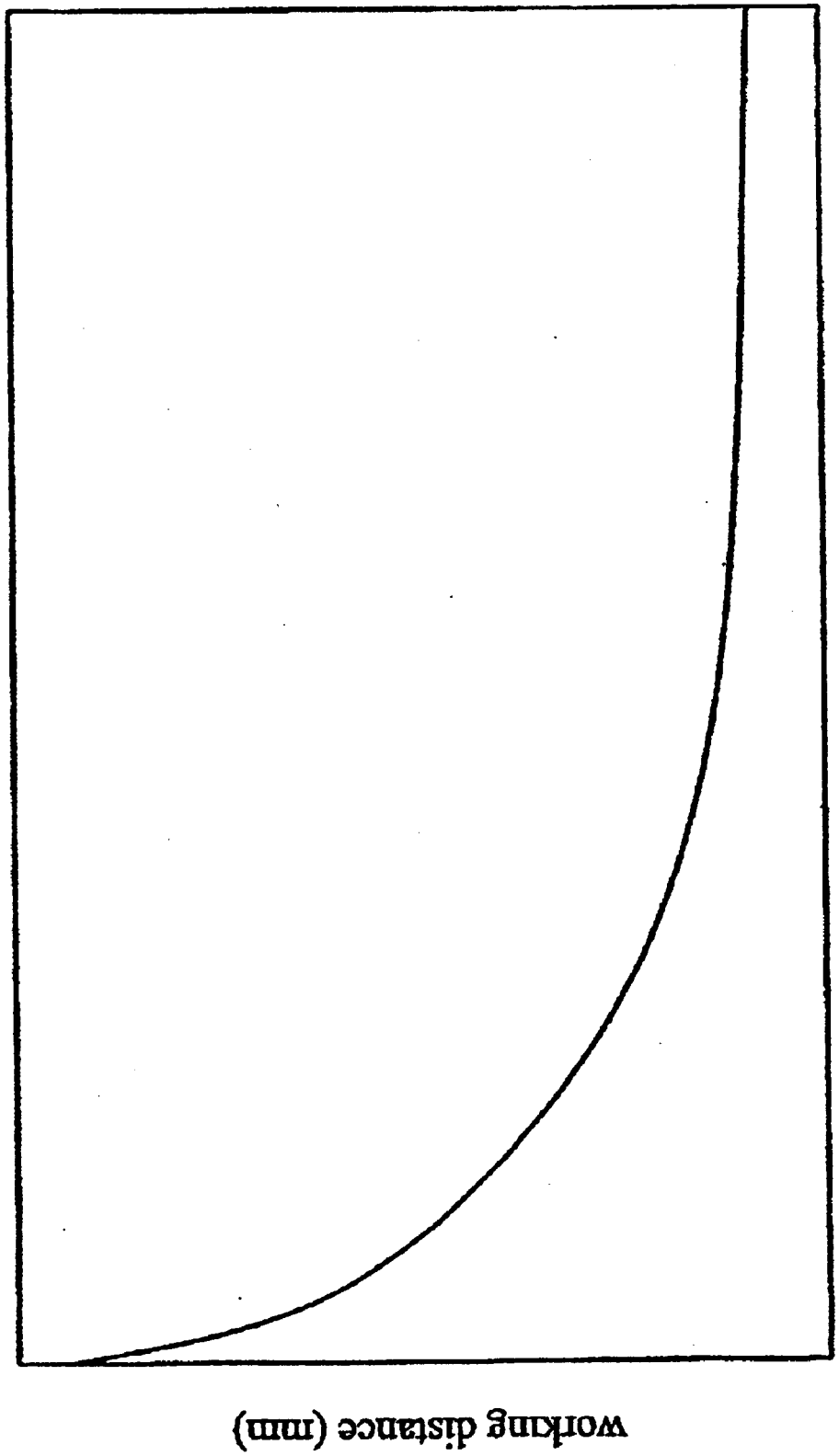
FIG. 4 depicts the relationship between a working distance and the distance between a ferrule and a GRIN lens.

Referring to FIGS. 2 and 3, FIG. 2 is used for introducing a working distance of a single fiber collimator, and FIG. 3 for that of a dual fiber collimator. A communication laser light emitted from the fiber core of the optical fiber always diverges at an angle, due to the numerical aperture of the fiber core. The GRIN lens 11 is able to adjust the divergence of the laser light so that the laser light converges at a position outside the GRIN lens and then diverges. The energy loss of the laser light is minimum at the above-mentioned position, and the distance D from the position to the GRIN lens is named "working distance" It is noted that the working distance D is determined by the distance d between the ferrule 12 and the GRIN lens 11. FIG. 4 depicts the relationship between D and d. If a fiber collimator of a predetermined working distance is given, then the distance between the ferrule and GRIN lens can be determined for producing the fiber collimator.

Figure 5:
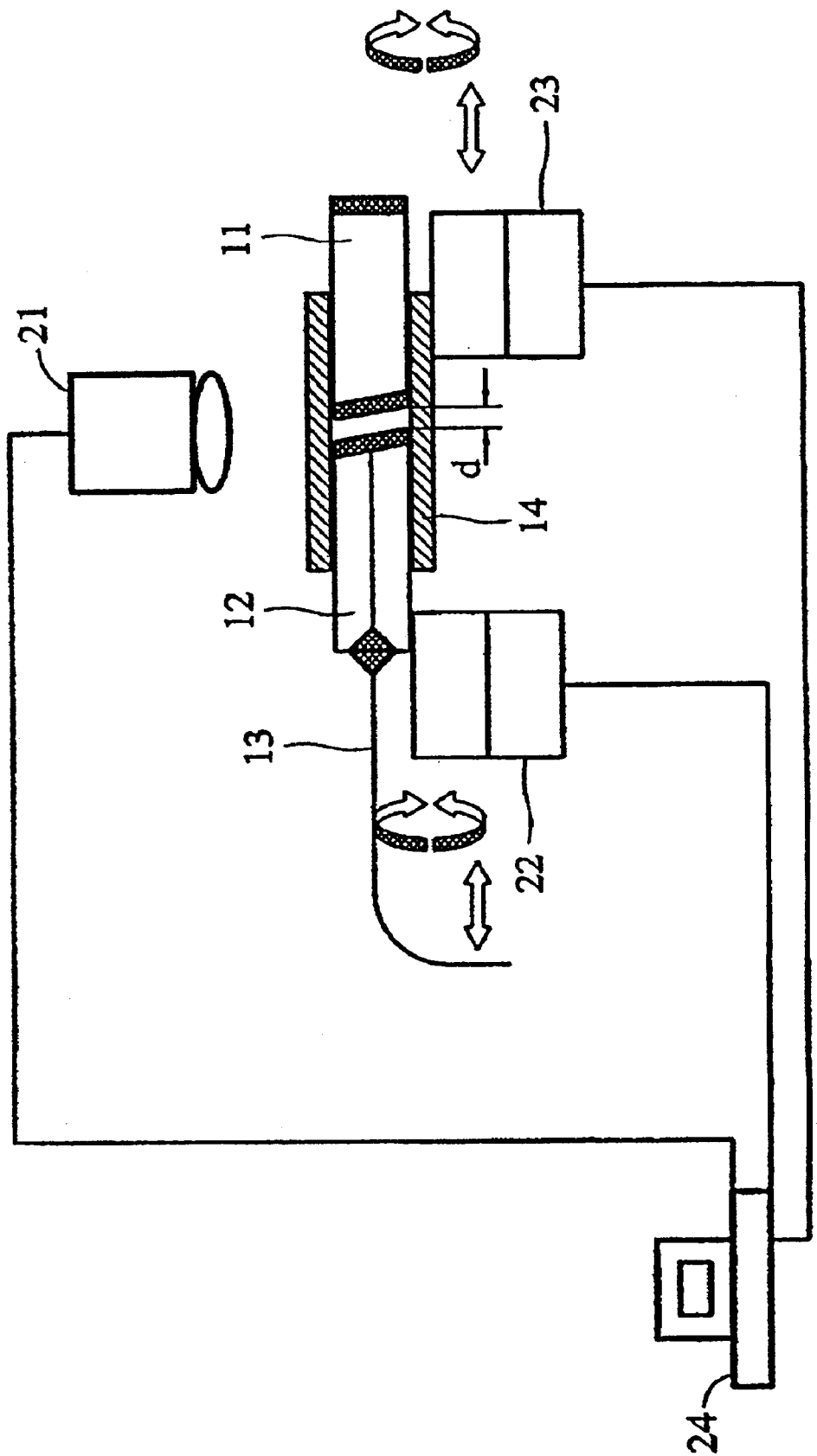
FIG. 5 depicts an automatic device for assembling fiber collimators in accordance with the present invention.

Now referring to FIG. 5, in the present invention, a GRIN lens 11 is inserted into a tubular holder 14 and fixed via epoxy or soldering, wherein the holder 14 is a transparent glass tube so that the holder 14 can be seen through from outside. Then, a pigtail 12 is inserted into the tubular holder 14 without being fixed. Then, an image pick-up device 21 records the orientation of the end surfaces of the pigtail 12 and GRIN lens 11, and transmits the image of the end surfaces to a personal computer 24. The personal computer 24 processes the image data and controls multi-axis tables 22 and/or 23 to rotate, thereby changing the orientation of the end surfaces of the pigtail 12 and GRIN lens 11. The operation is repeated until the end surface of the pigtail 12 is parallel to that of the GRIN lens.

Figure 6A:
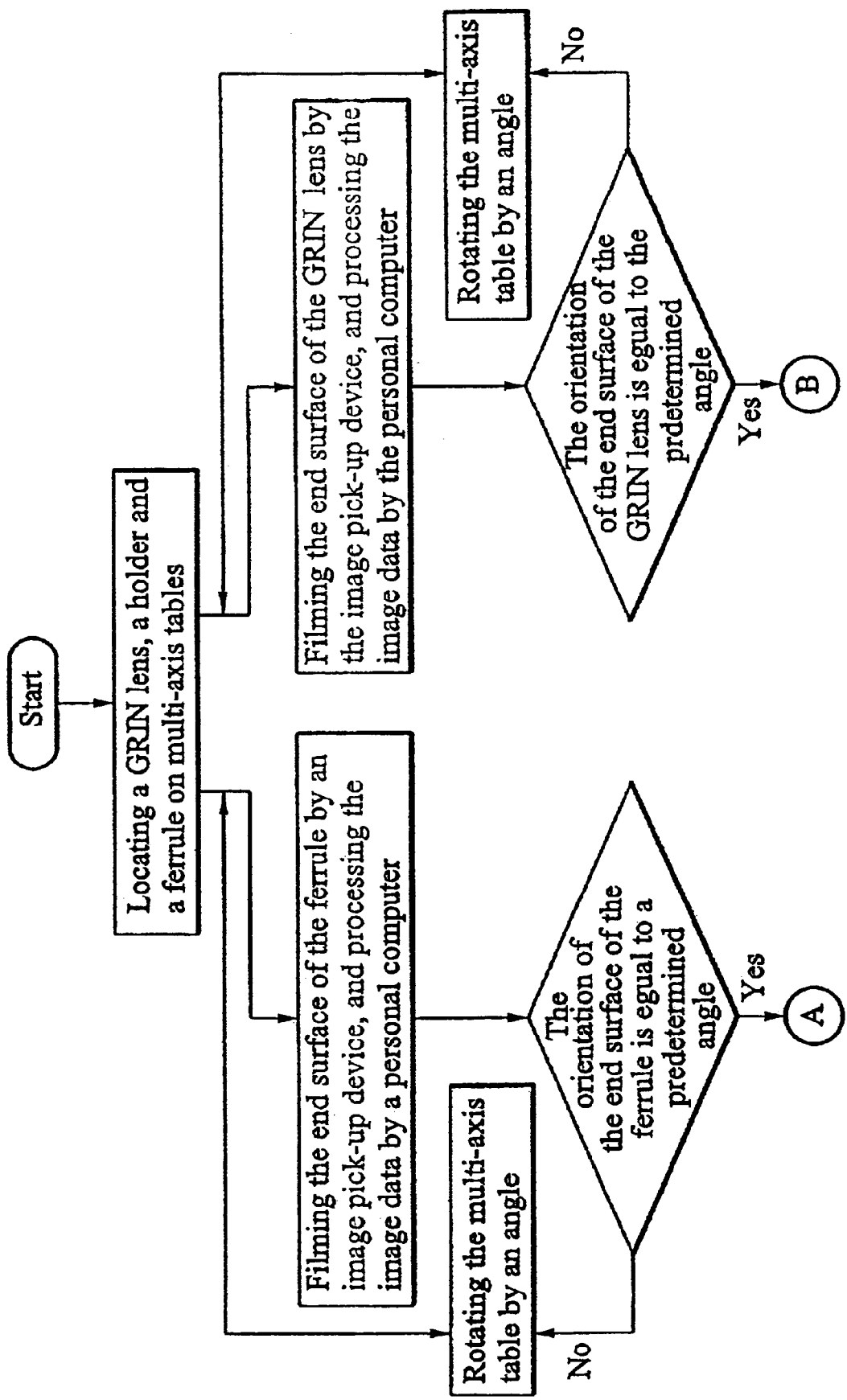
FIGS. 6A and 6B depict a flow chart of assembling a fiber collimator in accordance with the present invention.
Figure 6B:
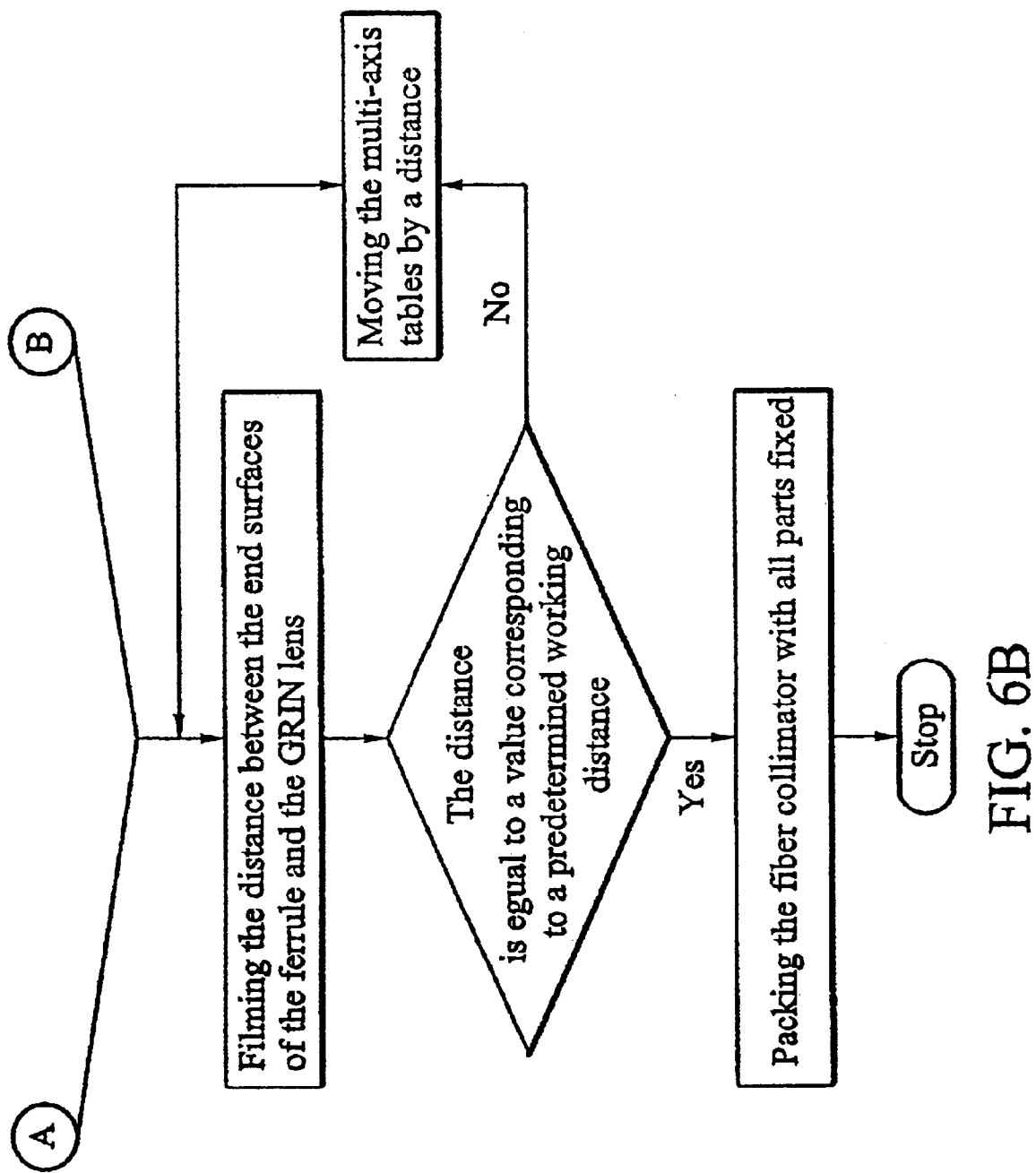

Next, the image pick-up device 21 films the distance between the pigtail and GRIN lens and transmits the image of the distance to the personal computer 24. The personal computer 24 processes the image data and controls the multi-axis tables 22 and/or 23 to move so that the distance between the pigtail and GRIN lens is equal to the desired (predetermined) value. Then, the pigtail 12 is fixed to the holder 14 via epoxy or soldering. FIGS. 6A and 6B depict the flow chart of the above operation.

In conclusion, the present invention provides an automatic device for assembling fiber collimators to promote the efficiency of manufacture and yield.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic device for assembling a fiber collimator, the fiber collimator including a transparent tubular holder, an optical fiber having a first end surface disposed at an end of the tubular holder, and a GRIN lens having a second end surface disposed at the other end of the tubular holder, the automatic device including:

a first driving table for rotating and moving the optical fiber;

a second driving table for rotating and moving the GRIN lens;

an image pick-up device for filming the first and second end surfaces, and outputting image data corresponding to the first and second end surfaces; and a processor receiving and processing the image data to rotate the first and second driving table so that the first and second end surfaces are parallel to each other, and move the first and second driving table so that a distance between the first and second end surfaces is equal to a predetermined value.

2. A method of assembling a fiber collimator, including the steps of:

providing a fiber collimator including a transparent tubular holder, an optical fiber having a first end surface disposed at an end of the tubular holder, and a GRIN lens having a second end surface disposed at the other end of the tubular holder;

filming the first and second end surfaces to generate image data corresponding to the first and second end surfaces; and processing the image data to rotate the optical fiber so that the first and second end surfaces are parallel to each other.

3. A method of assembling a fiber collimator as claimed in claim 2, further including the step of processing the image data to move the optical fiber so that a distance between the first and second end surfaces is equal to a predetermined value.

4. A method of assembling a fiber collimator as claimed in claim 2, further including the step of processing the image data to move the GRIN lens so that a distance between the first and second end surfaces is equal to a predetermined value.

5. A method of assembling a fiber collimator, including the steps of:

providing a fiber collimator including a transparent tubular holder, an optical fiber having a first end surface disposed at an end of the tubular holder, and a GRIN lens having a second end surface disposed at the other end of the tubular holder;

filming the first and second end surfaces to generate image data corresponding to the first and second end surfaces; and processing the image data to rotate the GRIN lens so that the first and second end surfaces are parallel to each other.

6. A method of assembling a fiber collimator as claimed in claim 5, further including the step of processing the image data to move the optical fiber so that a distance between the first and second end surfaces is equal to a predetermined value.

7. A method of assembling a fiber collimator as claimed in claim 5, further including the step of processing the image data to move the GRIN lens so that a distance between the first and second end surfaces is equal to a predetermined value.

* * * * *